United States Patent [19]
Phelps

[11] Patent Number: 5,033,964
[45] Date of Patent: Jul. 23, 1991

[54] BOOK FOR JOINT READING BY A VISUALLY IMPAIRED PERSON AND A SIGHTED PERSON

[76] Inventor: Shawn M. Phelps, 1839 Victorian Ct., Columbus, Ohio 43220

[21] Appl. No.: 451,110

[22] Filed: Dec. 15, 1989

[51] Int. Cl.5 .............................................. A61C 1/04
[52] U.S. Cl. ................................... 434/113; 434/157; 434/178
[58] Field of Search ............... 434/112, 113, 157, 178, 434/236, 238; 206/44 R, 44 B, 44.11, 45.31; 40/530; 281/15.1, 16, 22, 27.1; 273/DIG. 30

[56] References Cited

U.S. PATENT DOCUMENTS

| | | |
|---|---|---|
| 1,405,134 | 1/1922 | Hoyme . |
| 2,360,916 | 10/1944 | Von Trott . |
| 2,946,137 | 7/1960 | Worth et al. . |
| 3,055,118 | 9/1962 | Betancourt ..................... 434/157 X |
| 3,316,669 | 5/1967 | Nachbar ..................... 273/DIG. 30 |
| 3,797,146 | 3/1974 | Holes ............................. 281/15.1 X |
| 4,176,473 | 12/1979 | Rae ................................ 281/15.1 X |
| 4,419,837 | 12/1983 | Meeker . |
| 4,524,993 | 6/1985 | Walker-Taylor . |
| 4,596,407 | 6/1986 | Suska . |
| 4,702,700 | 10/1987 | Taylor . |
| 4,734,036 | 3/1988 | Kasha ................................. 434/157 |
| 4,802,855 | 2/1989 | Wood .................................. 434/157 |
| 4,878,844 | 11/1989 | Gasper et al. ....................... 434/113 |
| 4,896,900 | 1/1990 | Hong ............................... 40/530 X |

FOREIGN PATENT DOCUMENTS

| | | | |
|---|---|---|---|
| 871347 | 4/1942 | France ................................ 434/157 |
| 1578649 | 11/1980 | United Kingdom ................ 434/157 |

Primary Examiner—Richard J. Apley
Assistant Examiner—Jennifer L. Doyle
Attorney, Agent, or Firm—Porter, Wright, Morris & Arthur

[57] ABSTRACT

A book permitting one person to hold and read, or to follow along with the reader of the book, in which a set of removable pages that correspond numerically to fixed pages in the book include material corresponding to that appearing on the fixed pages. The book can be held and read by an unsighted or visually impaired person by means of Braille and/or large-sized type printed upon the removable pages. The relationship of sighted/unsighted may be reversed; and the invention may be adopted to other educational, translation or instructional purposes.

6 Claims, 2 Drawing Sheets

BOOK FOR JOINT READING BY A VISUALLY IMPAIRED PERSON AND A SIGHTED PERSON

FIELD OF THE INVENTION

This invention relates to a book which enables unsighted or visually-impaired persons jointly to read the book with a sighted partner, such as a child. The book includes removable pages which correspond numerically with the pages of the book and which have printed upon them Braille and/or large-sized print corresponding to the conventional text.

BACKGROUND OF THE ART

Reading is a fundamental and essential part of a person's lifelong learning process. Books which can be read to children (or students) for entertainment and educational purposes are well known. In the prior art, books are typically comprised of a plurality of bound pages which contain printed matter and illustrations in a single volume. in teaching reading skills, when a person reads to another person, such as a child, or vice versa, a book is usually held by one person or the other, or shared by both. In this manner, both persons have convenient visual access to text and illustrations.

When an unsighted person reads a Braille book to a child or student, the reader must hold the book in order to touch the Braille print and the child/student does not share equal viewing access to the text. A visually impaired person must also hold a book being read to use a magnifier or document scanner to read the book. In either instance, the child/student is deprived of the opportunity to hold the book and view the printed matter and illustrations. Thus, the educational impact of the reading experience is adversely affected and the relational aspect of a parent/teacher and child/student shared experience is disrupted.

The use of manipulatives, such as a hands-on bood held by the child/student in the teaching of reading skills, increases the child's/student's attention span and the interest in the material being read. Further, a beginning reader must be able to view the printed matter in order to read and learn from the experience. Neither of these objectives can be readily achieved in a sighted-/unsighted pairing because there are no books available in the prior art adopted to sighted/unsighted sharing.

In the prior art, C.R. Hoyme'patented book (U.S. Pat. No. 1,405,134) has removable illustrations for the purpose of entertaining the child looking at the book. A.T. Von Trott's U.S. Pat. No. 2,360,916 relates to greeting cards with openings on the front for view of the messages inserted within the pocket contained in the front cover of the card. S.V. Worth's U.S. Pat. No. 2,946,137 demonstrates a book with adhesive-backed, cut-out pictures, which the child matches to the text and then adheres to the spaces in the book provided beside the text in the book. C.J. Taylor's U.S. Pat. No. 4,702,700 demostrates an activity book with removable manipulatives which are stored in pockets on each page of the book. The manipulatives, such as small paper apples, have magnetic backings which adhere to a magnetic space on the illustration of the page, such as an apple tree.

Hoyme's invention is for the purpose of entertaining the child, while the Worth and Taylor inventions are directed toward educational purposes. Von Trott's greeting card presents a means of changing the message in the card. While the above inventions of the prior art involve the use of removable items from pockets or insert sleeves, none are related to the purpose of the present invention, which is to aid in the reading of a book to a child (or student) by an unsighted or visually-impaired person for both education and entertainment, while allowing the person to whom the book is being read to have full control of, and access to the book, thus increasing the enjoyment and educational benefits of the reading experience.

Other prior art includes U.S. Pat. Nos. 4,596,407; 4,524,993 and 4,419,837 which relate to variations of book assemblies that have removable or dividable pages or pocketed carriers for other materials.

None of the cited prior art is directed to paired sighted/unsighted reading of a book by partners in a parent/child or teacher/student relationship.

OBJECTS OF THE INVENTION

It is an object of the invention to provide a book which can be read to or by unsighted persons in a paired relationship with sighted persons in a convenient manner such that a wholesome shared experience results. It is also an object of the invention to provide a book with removable pages, stored in pockets in the book pages, which correspond numerically with the pages in the book. The removable pages have print in both large-size type and Braille. The use of these removable pages allows one of the sighted/unsighted pair to hold the bood while the other reads the book.

Thus, it is an object of the invention to provide a book and a method which enables a visually impaired or blind parent to read to sighted children in a shared experience.

This object fulfills desirable goals. First, because reading is a fundamental and essential part of a child's learning process, reading to a child is an activity that most parents employ to entertain and educate. The parent with severe vision problems, however, is unable to enjoy reading time with their child(ren) in the "Normal" way, in which the parent reads while the child follows the pictures and words. The invention provides a removable text that makes it possible for the parent to remove the text from each page of the book and hold it on the lap to be read by Braille, or held under a scanner or close to the eye with a magnifier. The child can hold the book that contains normal print and illustrations, following along as the parent reads. Obversely, when the child reads, the parent can use the removable text to make sure the child is reading the correct words.

In general, the object of the invention is to simplify pairings of readers and audiences when one or the other uses a media or language that is not readily recognizable by the other. Other uses of the invention include language education and translation. In the classroom, for example, when a teacher reads a book to a class, the conventional book is held outward toward the class and the teacher must read upside down, or the words are read and then pictures are shown to the class. With removable text in accordance with the invention, the book can be held toward the class so they can see the illustrations simultaneously and the teacher can hold the text and read normally. The invention can also be applied to language education where the different sets of pages are in different languages. Other instructional applications of the invention, such as in cookbooks or "How-To" books may also be evident.

DESCRIPTION OF THE PREFERRED EMBODIMENT

In its most preferred aspect, the book of the present invention provides a means by which an unsighted or visually-impaired person can read a book to a child or student. Most often, the unsighted or visually-impaired person is unable to enjoy sharing a reading experience with a child in a "Normal" way. Typically, the unsighted or visually-impaired person must hold the book to read it by means of touching the Braille characters or by using a magnifying glass or document scanner. When this occurs, the child is deprived of the experience of holding the book and seeing the printed words and illustrations as the book is read to him or her. Because of the lack of hands-on learning through the use of manipulatives, such as books, the child's attention span is shortened and the child's visual association of words and pictures and the educational benefits of the reading are decreased.

By the use of the book of the invention, the parent or reader and the child can share the reading experience, which enhances the child's interest in reading and improves the reading skills of the child. Children of visually-impaired or unsighted parents are not deprived of this educational and entertaining experience, and barrieres in communication are lessened by creating a more "Normal" environment for their sighted children.

Figure 4:
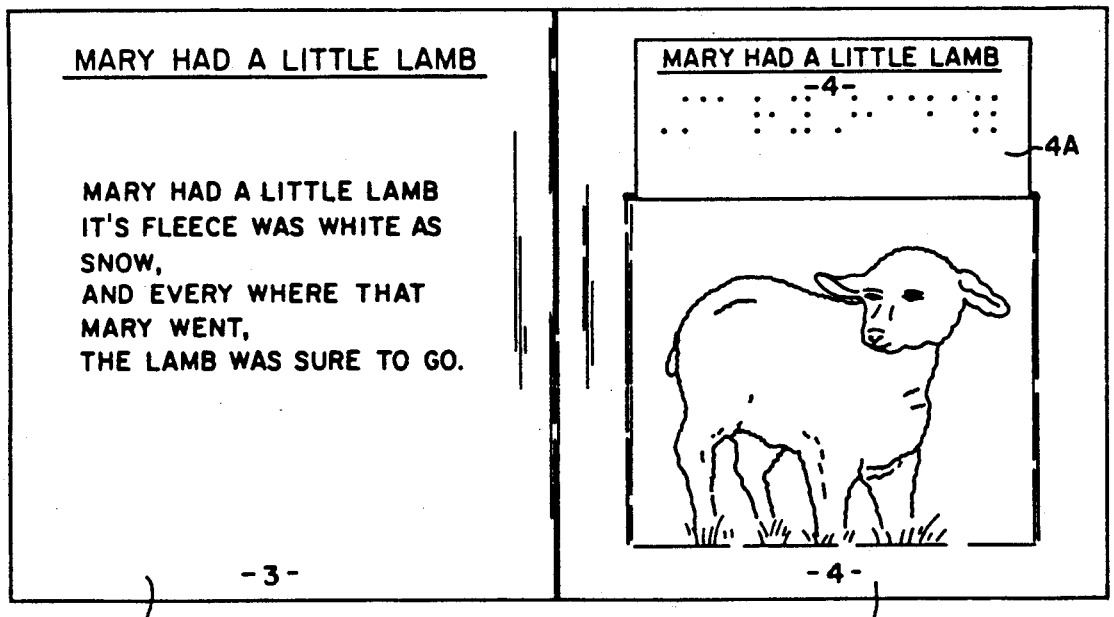
FIG. 4 illustrates the side-by-side relationship of texts on the adjacent pages.

The book of the invention is comprised of a plurality of bound pages. As the book is displayed in its open position, in FIG. 4, the left-hand pages of the book contain the printed text of the story of the book, while the right-hand pages contain printed illustrations which correspond to the text on the opposite page. The right-hand pages of the book include pockets with an opening at the top in which heavy-grade cards (pages) are inserted for storage. Pockets which open to the side are less preferred, because the removable pages may slide out when the book is stored in the usual upright position, as on a library shelf. These removable pages are imprinted with the identical text which is printed on the corresponding left-hand page of the book. However, the text on the removable pages of the book is printed in Braille and/or in large-sized print for the visually-impaired reader. Braille may be overlayed over large print.

The removable pages are numbered at the bottom to match the left-hand pages of the book. The numbers are printed in large-sized print and also in Braille on both the left-hand pages and the removable pages to enable the unsighted or visually-impaired reader to replace the removable pages in the appropriated pockets if more than one removable page is removed from the book at once, and the removed pages are not in numerical sequence.

Thus, the invention includes a slot on the right hand pages of the book which forms the opening of a pocket that receives a corresponding page from the second set. The second set of pages are heavy grade cardboard slide-out cards that contain the text for that page. Large print type and Braille can be used on the same slide out card. The card material may be resin or polymer based as well as a paper; And the location of the slots on either or both pages and the position of the slot on each page as well as the relative size and shapes of the slot/card realtionship can vary depending on design or use considerations.

The text will also be printed on the left-hand page so the child can follow along with the reader. Art work may appear on the right stationary page. The child can have control of the book as the parent reads and both can share in a simultaneous experience unencumbered by apparatus or uncomfortable positions.

EXAMPLE

Figure 1:
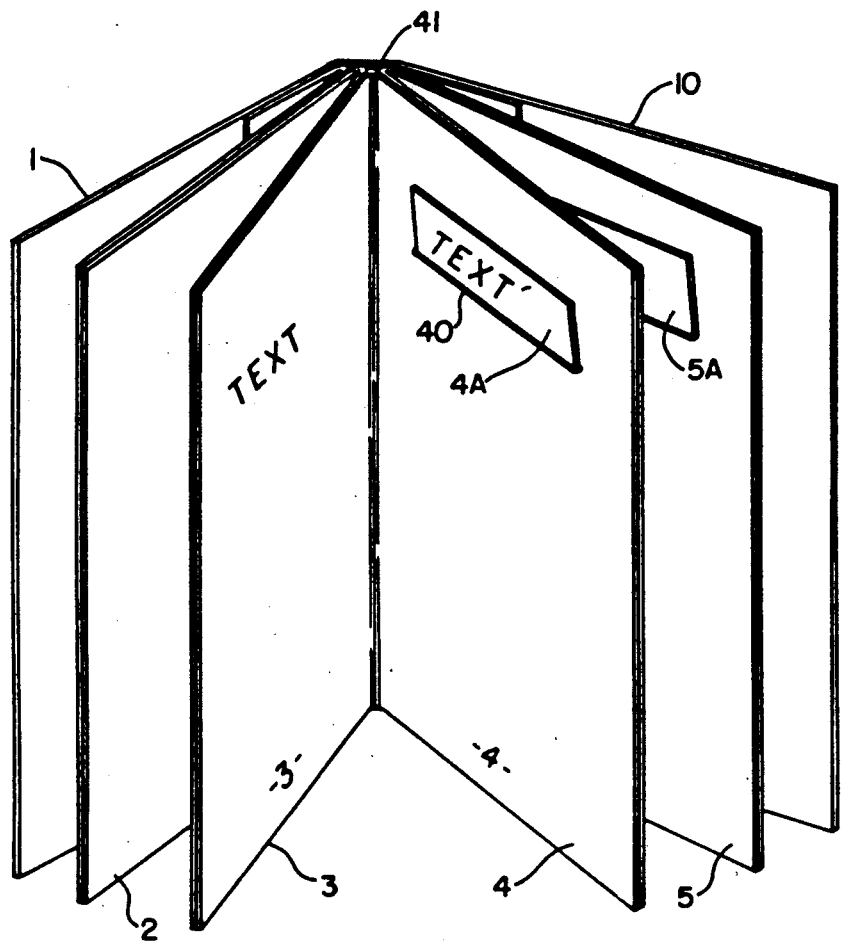
FIG. 1 is a perspective view of the book

FIG. 1 illustrates a view of the book in perspective. Reference numerals 1 and 10 respectively indicate the front and back covers of the book and 11 its binding spine. For simplicity, only a few pages are shown, indicated by reference numerals 2, 3, 4 and 5. Pages indicated by 3 and 4 are typical of pages in each set. Page 3 includes a standard print text, indicated in the drawing as "TEXT", and illustrations; Facing page 4, however, includes a slit pocket opening, 40, in which there is included a removable card, 4A, with Braille or large print representations thereon corresponding to the text of page 3. This relationship of normal/visually impaired text and fixed page removable cards is maintained throughout the book.

Figure 2:
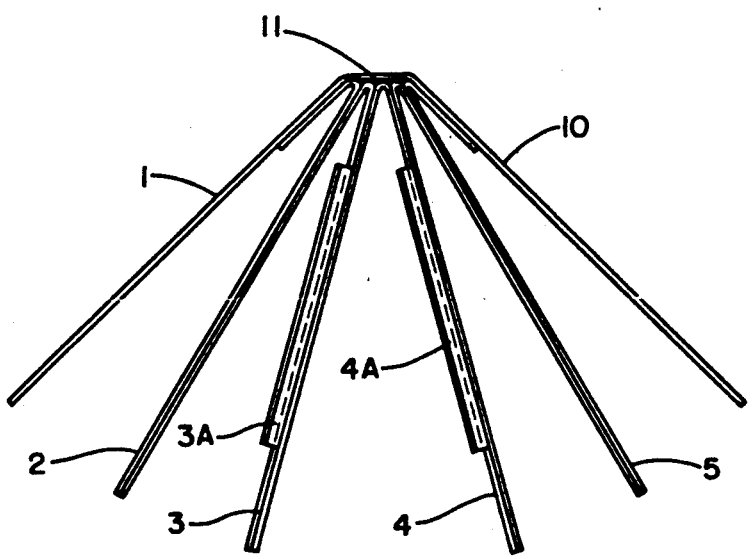
FIG. 2 is a plan view of the book from above showing its elements of its assembly.
Figure 3:
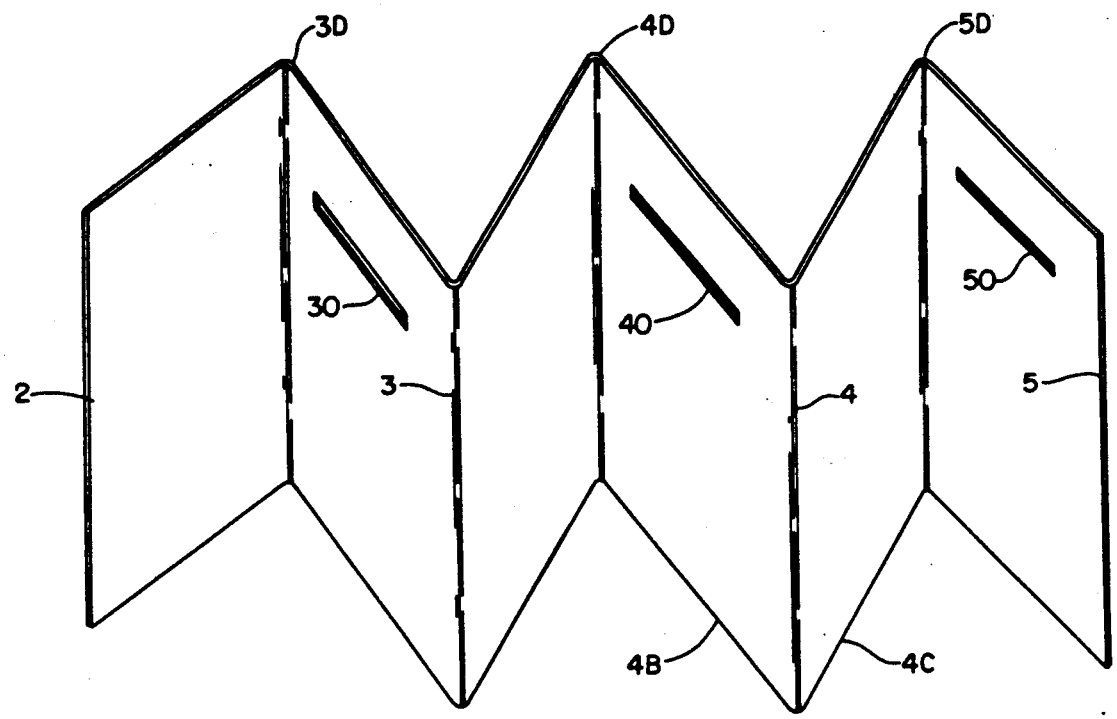
FIG. 3 is a view of the book, showing a folding arrangement of pages whereby pockets are formed on adjacent pages.

The pages can be formed from the same continuous roll of paper. FIG. 2 shows a plan view of the book and the relationship of its assembly components in which are reference numerals correspond to the same elements in FIG. 1. FIG. 3 shows a folio arrangement of a continuous length of paper whereby pocket forming slits, 30, 40 and 50, are included on alternate folds respectively between pages formed by folded sheets 2-3, 3-4 and 4-5. The bottoms of the sheets, e.g. 4B and 4C may be adhesively fastened to form a pocket such that the card inserted does not slip through. The back edges of the pages, 3D, 4D and 5D, are fastened with the book binding; 11.

The weight of paper to be used, stiffness of the cards and relative proportions of pages and cards are a matter of good design practice. The left or right orientation or other placement of the slit pocket, such as to the side, top or bottom are similarly matters of design practice.

The general system of the invention is useful in other applications. As a teaching aid, a normally-sighted person may use the removable page corresponding to the fixed page. Usually, when a teacher reads a book to a class, the book is held in an outward position toward the students, and the teacher must either read upside down, which is difficult, or the teacher reads the text and then the pictures are shown to the students. With the use of the removable pages, the book can be held toward the students so they can see the printed words and illustrations, while the teacher holds the removable text and reads normally. In other instances, an unsighted or visually-impaired person may listen to a beginning reader practice reading, while the listener follows along on the text of the removable page to be certain the reader is accurate.

While the invention is principally intended as an aid to the sight impaired, the principle of the invention would also be useful in: coookbooks, in which the slotteed page would include a photograph and the removable card may include a recipe; In "How-To" books containing instructions or diagrams that require proximate access at a work site; or language instruction books in which the foreign language would be included and related in printed English in the same manner as the Braille or large text referred to herein.

What is claimed is:

1. A story book to be used together by an unsighted or visually-impaired person and a sighted person comprising:

a first set of pages which have conventionally printed upon them normal-sized text for the sighted person to view;

a second set of pages which correspond on a page-by-page basis to the text of the first set of pages in the book, the second set of pages including thereon large-sized text and braille superimposed over the large-sized text corresponding to the text of the first set of pages, which large-sized text and braille communicate to the unsighted or visually-impaired person of the text of the first set of pages to enable the unsighted or visually-impaired person to be able to read the book with the sighted person; and the first set and the second set of pages being in a side-by-side relationship in the book so that the corresponding pages face each other.

2. The book of claim 1, further comprising: a removable page component associated with one of the sets of pages.

3. The book of claim 2, wherein the removable page component is replaceable in the set from which is it removed.

4. The book of claim 2, further comprising: storage pockets formed in the pages of one of the sets for storing the removable components.

5. The book of claim 1, wherein at least some of the pages include illustrations thereon.

6. A method for using a storybook, said book comprising a first set of pages with normal size text thereon and a second set of pages having representations associated therewith which correspond on a page-by-page basis to said first set of pages, said representations communicate to an unsighted or visually impaired person the text of said first set of pages, said method comprising the step of:

reading of said representations associated with said second set of pages by an unsighted or visually impaired person while a sighted person is viewing corresponding pages of said first set of pages.

* * * * *